Sept. 20, 1955  H. A. STUART  2,718,600
BRAKE APPLICATOR FOR TRAILER BRAKES
Filed Jan. 14, 1952
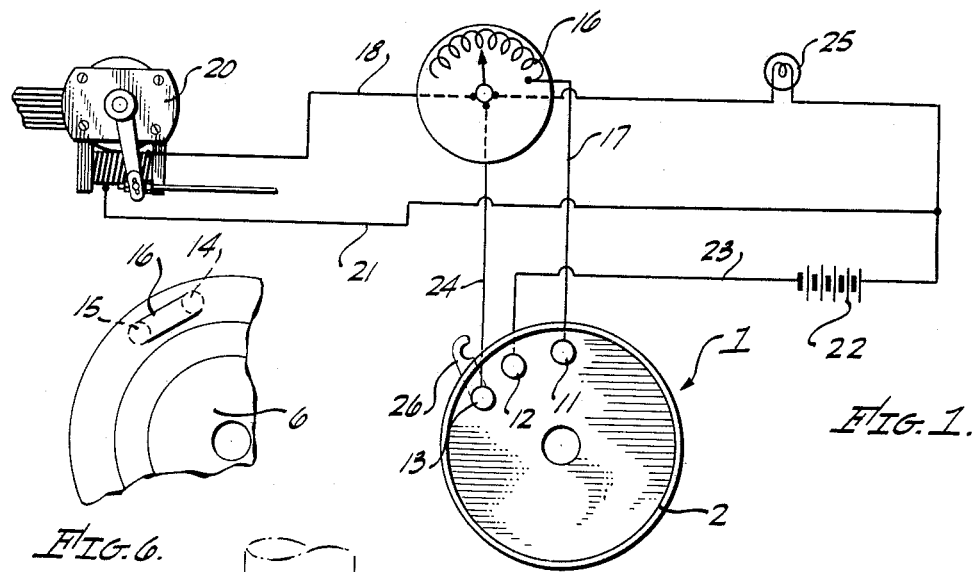
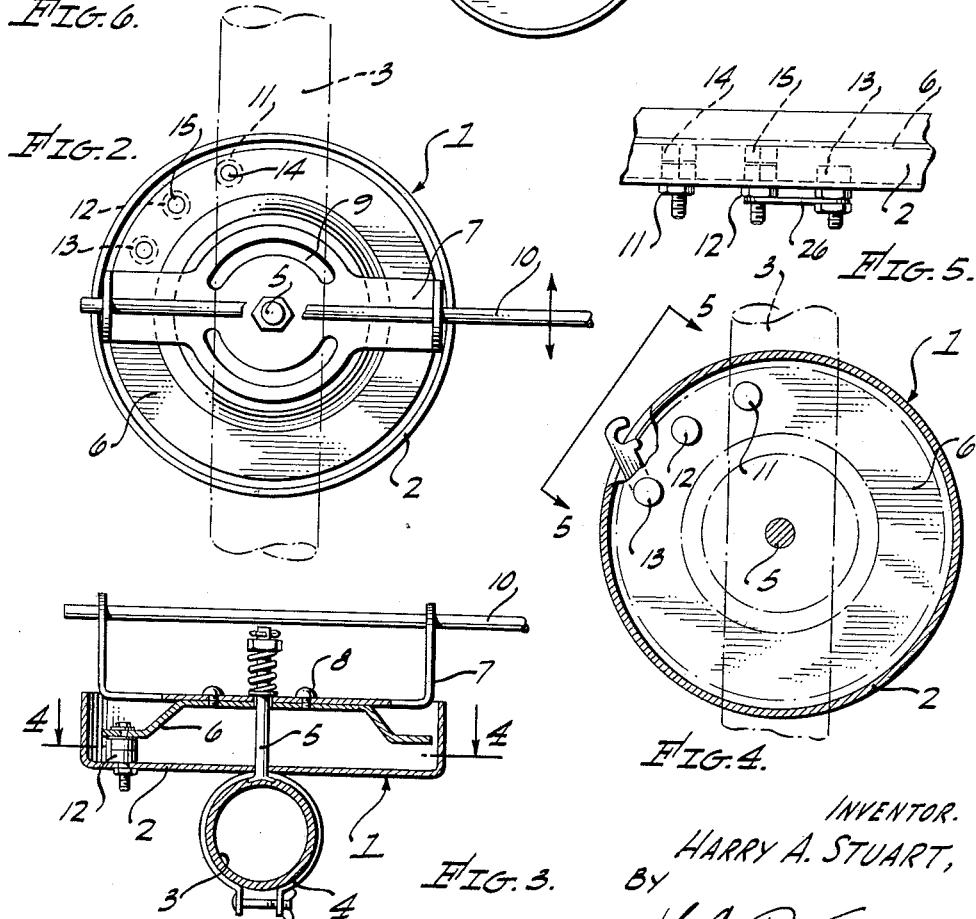
INVENTOR.
HARRY A. STUART,
BY
ATTORNEY.

United States Patent Office 2,718,600
Patented Sept. 20, 1955

2,718,600

BRAKE APPLICATOR FOR TRAILER BRAKES

Harry A. Stuart, Long Beach, Calif.

Application January 14, 1952, Serial No. 266,422

3 Claims. (Cl. 307—125)

This invention relates to a brake applicator for trailer brakes, and particularly for electrically actuated trailer brakes of the type used on house trailers.

An object of my invention is to provide a novel brake applicator in which electrical contacts permit current to flow to an electrically actuated trailer brake.

Another object of my novel brake applicator is to provide an electrical brake control in which the current can be controlled to the brake actuating mechanism through an adjustable rheostat.

Still another object is to provide a novel brake applicator in which electrical contacts are caused to be made when the vehicle brake is applied, and these contacts being so arranged that the current either passes through an adjustable rheostat or by-passes this rheostat when the brakes are fully applied.

A feature of my invention is to provide a novel applicator which is simple in construction, effective in operation and inexpensive to manufacture.

Other objects, advantages and features of invention may appear from the accompanying drawing, the subjoined detailed description and the appended claims.

In the drawing:

Figure 1 is a diagrammatic wiring arrangement of my brake applicator.

Figure 2 is a top plan view of the brake applicator.

Figure 3 is a transverse sectional view of the same.

Figure 4 is a sectional view taken on line 4—4 of Figure 3.

Figure 5 is a fragmentary side view taken from the line 5—5 of Figure 4.

Figure 6 is a fragmentary plan view of the rotatable contact disc.

Referring more particularly to the drawing, my brake applicator 1 consists of a cup 2 which is open at the top for a purpose to be further described. The cup 2 is secured to the steering column 3 of the automobile by means of a clamp 4 which encircles the steering column. The clamp 4 has a pin 5 fixedly secured thereto, and this pin projects upwardly through the cup 2, substantially as shown. A contact disc 6 is rotatably mounted on the pin 5 and a U-shaped bracket 7 is adjustably secured to the top of the disc 6 by means of screws 8 which extend their arcuate slots 9 in the bracket 7 and screw into the disc 6. A rod 10 is attached at one end to the bracket 7 and the other end of this rod is attached to the brake pedal of the towing automobile.

The cup 2 is provided with three spaced and fixed contacts 11, 12 and 13. The contact disc 6 is provided with two spaced contacts 14 and 15 on the bottom thereof, and these contacts are connected by a bus bar 16 so that current will flow between these two contacts. A rheostat 16 is of the manually adjustable type which is usual and well known in the art. A lead 17 extends from one side of the rheostat 16 to the contact 11. The center post of the rheostat 16 is connected through a lead 18 to the electrical brake applicator 20, which is usual and well known in the art, and one example is shown in Patent Number 2,039,509 issued May 5, 1936. A lead 21 extends from the coil of the actuator 20 to a battery 22. The other side of the battery 22 is connected through a lead 23 to the contact 12.

When the vehicle brakes are normally applied, the disc 6 will be rotated until the contacts 14, 15 engage the contacts 11, 12 respectively. Current is thus fed to the rheostat 16 and thence through the lead 18 to the trailer brake actuator 20. If the vehicle brakes are fully applied the disc 6 will further rotate so that the contacts 14, 15 engage the contacts 12, 13 respectively. In this instance the resistance of the rheostat 16 is by-passed, since the lead 24 connects the contact 13 directly to the center post of the rheostat 16 and thence directly to the lead 18. A signal light 25 is connected between the rheostat 16 and the battery 22 to indicate that the apparatus is functioning.

If it is desired to temporarily by-pass the rheostat 16, I provide a bus bar 26 which can be manually swung to connect the contacts 12 and 13, and thus the brake 20 will be constantly applied as when going down a long hill so that the trailer brakes will then act as a holding brake. This, however, is only an emergency procedure.

Having described my invention, I claim:

1. A brake applicator for trailer brakes comprising a stationary cup, a plurality of spaced electrical contacts mounted in said cup and extending into the same, a disc positioned within the cup, means in the cup on which the disc is rotatably mounted, an electrical contact on said disc engageable with any of the first named contacts, and operating means engaging said disc to rotate the same, said operating means including a rod, and means attaching said rod to the disc for longitudinal adjustment of the rod relative to the disc.

2. A brake applicator for trailer brakes comprising a stationary cup, a plurality of spaced electrical contacts mounted in said cup and extending into the same, a disc, a pin fixedly mounted in the cup and extending through said disc, said disc being journaled on the pin, an electrical contact on said disc engageable with each of the first named contacts, a U-shaped bracket, means adjustably attaching the U-shaped bracket to the top of the disc, and a rod slidably mounted in said U-shaped bracket.

3. A brake applicator for trailer brakes comprising a stationary cup, a plurality of spaced electrical contacts mounted in said cup and extending into the same, a disc, a pin fixedly mounted in the cup and extending through said discs, said disc being journaled on the pin, an electrical contact on said disc engageable with each of the first named contacts, a U-shaped bracket, means adjustably attaching the U-shaped bracket to the top of the disc, and a rod slidably mounted in said U-shaped bracket, a manually adjustable rheostat, and electrical leads extending from said first named contacts to the rheostat.

References Cited in the file of this patent

UNITED STATES PATENTS

| 1,189,900 | Apple | July 4, 1916 |
| 1,223,134 | Arbuckle | Apr. 17, 1917 |
| 1,319,542 | Wardell | Oct. 21, 1919 |
| 1,605,120 | Lorentzen | Nov. 2, 1926 |
| 2,026,773 | Dressel et al. | Jan. 7, 1936 |
| 2,239,374 | Schellenberger et al. | Apr. 22, 1941 |
| 2,268,550 | Little et al. | Jan. 6, 1942 |